United States Patent [19]
Couture

[11] 3,816,843
[45] June 11, 1974

[54] SHUTTER MECHANISM
[75] Inventor: Robert L. Couture, Rochester, N.Y.
[73] Assignee: Eastman Kodak Company, Rochester, N.Y.
[22] Filed: Nov. 24, 1972
[21] Appl. No.: 309,552

[52] U.S. Cl. .............................................. 354/250
[51] Int. Cl. .............................................. G03b 9/10
[58] Field of Search .......................................... 95/59

[56] References Cited
UNITED STATES PATENTS
| | | | |
|---|---|---|---|
| 2,571,756 | 10/1951 | Pribus | 95/59 |
| 3,033,092 | 5/1962 | Ernisse et al. | 95/59 |
| 3,405,624 | 10/1968 | Peterson | 95/59 |
| 3,412,660 | 11/1968 | Wasielewski | 95/59 X |
| 3,645,186 | 2/1972 | Kitai | 95/59 |

Primary Examiner—Samuel S. Matthews
Assistant Examiner—Michael L. Gellner
Attorney, Agent, or Firm—Robert F. Brothers

[57] ABSTRACT

A shutter mechanism including a shutter blade, a shutter driver and a shutter spring. The shutter blade is pivotally mounted for rotation between a closed and an open position and the shutter drive is pivotally co-mounted for rotation from an initial position in a first direction to drive the shutter blade to its open position and for rotation from its initial position in a second direction to permit cocking of the shutter drive mechanism without moving the shutter blade from its closed position. The shutter spring normally urges the shutter blade toward its aperture covering position. During movement of the shutter driver in the second direction, the shutter spring maintains the shutter blade in its aperture covering position and urges the shutter driver toward its initial position.

5 Claims, 4 Drawing Figures

SHUTTER MECHANISM

BACKGROUND OF THE INVENTION

1. Field of the Invention

This invention relates to photographic apparatus, and in particular to a mechanism for insuring that a movable shutter blade remains in its closed position during cocking of a shutter drive mechanism.

2. Description of the Prior Art

Lower priced cameras commonly include a shutter blade which is rotatably mounted on a post for movement between an exposure aperture covering or closed position and an exposure aperture uncovering or open position. Generally, the shutter is of the "impact" type and is rotatable to its open position in response to the release of a movable high energy lever which strikes the blade. A return spring is provided for biasing the shutter blade toward its closed position. The high energy lever must also be returned to its initial position so that the camera will be prepared for exposure of the next frame of film. With available shutter blades, such movement of the high energy lever may be accompanied by a jarring of the shutter blade which could result in an undesired exposure of the film.

SUMMARY OF THE INVENTION

Accordingly, it is an object of the present invention to provide an improved mechanism for preventing accidental exposure of the film during cocking of the shutter drive mechanism.

Another object is to provide such an improved shutter mechanism having a single driver to drive the shutter blade and permit cocking of the shutter drive mechanism.

Still a further object is to provide such an improved mechanism which may be manufactured in an economic and simple manner.

These and other objects are accomplished according to the present invention by means of a camera shutter mechanism comprising a shutter spring, an impact shutter blade and a driver. The shutter blade is pivotally mounted for rotation between an exposure aperture open position and an exposure aperture closed position. The driver is pivotally co-mounted with the shutter blade. The shutter blade and driver are biased toward the aperture closed position by the shutter spring. For exposure operation of the camera, the driver drives the shutter blade to its open position in response to movement of the camera high energy lever. During cocking operation of the camera, the driver moves to permit cocking of the shutter drive mechanism while maintaining the shutter blade in its closed position.

BRIEF DESCRIPTION OF THE DRAWINGS

In the preferred embodiment of the invention described below, reference is made to the accompanying drawings in which.

DETAILED DESCRIPTION OF THE PREFERRED EMBODIMENT

Because photographic cameras are well known, the present description will be directed in particular to apparatus forming part of, or cooperating more directly with, a shutter mechanism in accordance with the present invention. It is to be understood that elements of photographic cameras not specifically shown or described may take various forms well known to those skilled in the art.

Figure 1:
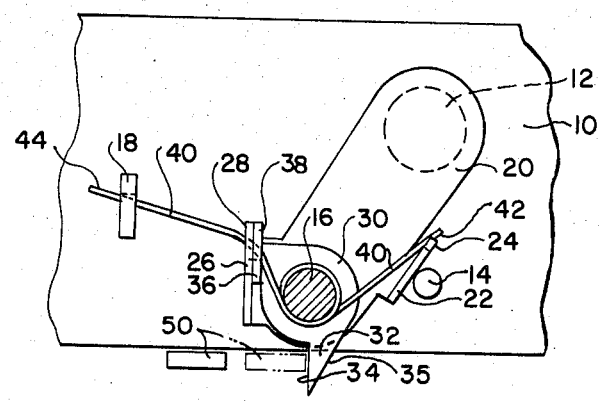
FIG. 1 is a front view of a shutter mechanism according to the present invention, with the shutter blade in its closed position.
Figure 3:
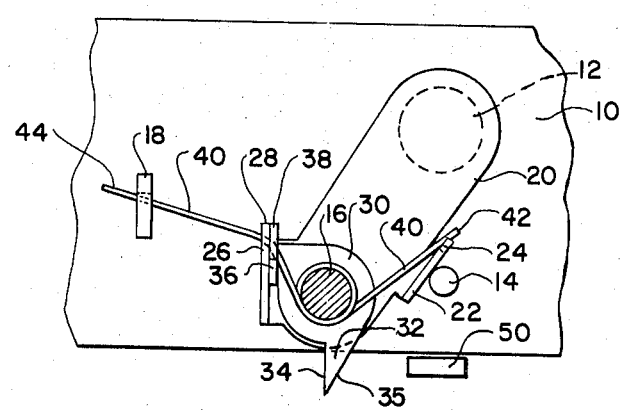
FIG. 3 is a view of the shutter mechanism of FIG. 1 after exposure operation and prior to cocking operation of the camera.

Referring now to FIG. 1, there is illustrated a portion of a camera frame 10 which would be mounted in the interior of a photographic camera. Provision is made in frame 10 for an exposure aperture 12 which is shown in phantom in FIG. 1 and through which a photographic film may be exposed. Fixedly mounted to frame 10 are a shutter blade stop 14, a pivot pin 16 and a spring engaging lug 18. A high energy lever 50 is also mounted within the camera for movement alongside frame 10. Lever 50 may be releasable from its cocked position as illustrated in FIG. 1 for movement to its uncocked position as illustrated in FIG. 3 by the camera operator in any manner which is known in the art.

The shutter mechanism of the present invention comprises a shutter blade 20, a shutter driver 30 and a shutter spring 40. Shutter blade 20 is rotatably mounted on pivot pin 16 and extends over aperture 12 in covering relationship. Shutter blade 20 includes a lug 22 having an ear 24 and a lug 26 having an ear 28. Shutter driver 30 is rotatably co-mounted with shutter blade 20 on pivot pin 16. Driver 30 includes a drive portion 32, having a drive surface 34 and a cam surface 35, and a shutter blade drive lug 36 having an ear 38 integrally formed therewith. Shutter drive spring 40 is preferably of the elongated spring wire form and has opposed ends 42 and 44. Shutter drive spring 40 is wound around pivot pin 16 and is engageable by ear 28 on shutter blade 20 and ear 38 on shutter driver 30. End 44 is engaged by lug 18 on frame 10. End 42 is engaged by ear 24 on shutter blade 20 and biases shutter blade 20 to its closed position wherein lug 22 engages stop 14.

Figure 2:
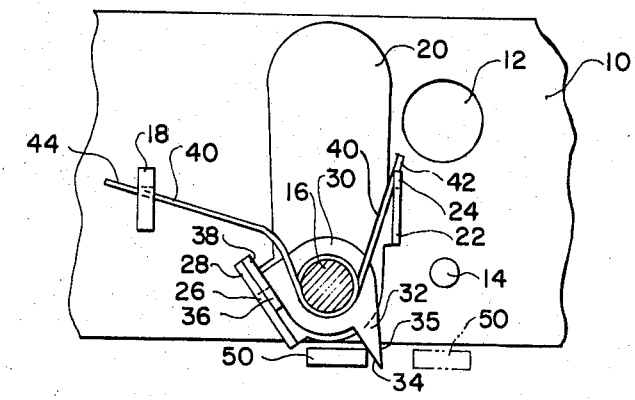
FIG. 2 is a view of the mechanism of FIG. 1 during exposure operation of the camera.

The shutter mechanism is illustrated in FIG. 1 in its closed condition just prior to exposure operation of the camera. Shutter blade 20 is biased to its closed position abutting stop 14 by means of spring 40. Upon exposure operation of the camera, high energy lever 50 is released for movement to the right to actuate the shutter mechanism. High energy lever 50 engages drive surface 34 of shutter driver 30, thereby causing counterclockwise rotation of driver 30. Such rotation is transmitted through lug 36 to lug 26, causing counterclockwise rotation of shutter blade 20 as illustrated in FIG. 2. Movement of blade 20 causes uncovering of exposure aperture 12, thereby permitting exposure of the film. High energy lever 50 continues moving until it disengages from drive surface 34 and reaches the position illustrated in FIG. 3. Simultaneously, spring 40 acts to terminate exposure operation by exerting a return bias upon shutter blade 20 through engagement with tab 24 until blade 20 abuts against stop 14. The duration of exposure will be determined by the energy stored within spring 40 during movement of high energy lever 50 to the position illustrated in FIG. 3 and may be altered by changing the dynamic characteristics of the shutter mechanism.

Figure 4:
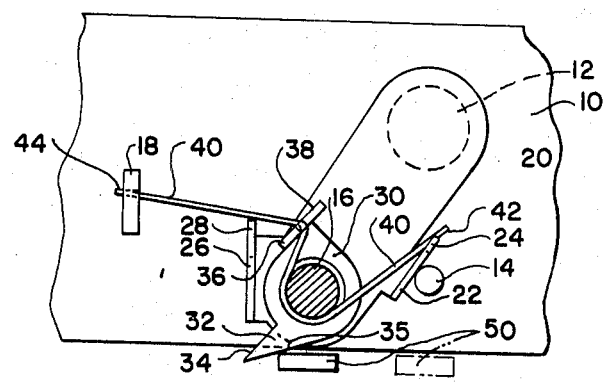
FIG. 4 is a view of the shutter mechanism of FIG. 1 during cocking of the shutter drive mechanism.

In order to prepare the shutter mechanism for subsequent exposure operation of the camera, high energy lever 50 must be returned to its initial position as illustrated in FIG. 1. During such movement, high energy lever 50 will engage cam surface 35 of shutter driver 30 and will cause clockwise rotation of shutter driver 30 as is illustrated in FIG. 4. However, this rotation will not be transmitted to shutter blade 20 since there are no engaging surfaces on driver 30 and blade 20 for such transmission. Thus, driver 30 functions as a one-way clutch for driving blade 20. Spring 40 will store energy during rotation of driver 30 and movement of high energy lever 50 to its energized position. This energy will be released to return shutter driver 30 to its initial position when contact between high energy lever 50 and cam surface 35 is terminated. Biasing of spring 40 during return movement of high energy lever 50 also assists in maintaining shutter blade 20 in its exposure aperture closed position, because of engagement between spring end 42 and tab 24 on shutter blade 20. The shutter mechanism has now been returned to its initial condition as illustrated in FIG. 1, ready for subsequent exposure operation of the camera.

This invention has been described in detail with particular reference to a preferred embodiment thereof, but it will be understood that variations and modifications can be effected within the spirit and scope of the invention.

I claim:

1. In a camera which includes a shutter having an aperture covering position, a high energy lever movable from a cocked position and means for moving the high energy lever to its cocked position, the improvement comprising:
   a shutter drive mounted in engagement with the shutter to drive the shutter to an aperture uncovering position in response to movement of the high energy lever from its cocked position and mounted for movement out of engagement with the shutter during return of the high energy lever to its cocked position; and
   a spring engaged with the shutter to urge the shutter to its aperture covering position and engageable with said shutter driver during return of the high energy lever to its cocked position to urge said shutter driver into engagement with the shutter.

2. In a camera having an exposure aperture, a shutter mechanism comprising:
   a shutter blade mounted within the camera for movement between an aperture covering position and an aperture uncovering position;
   shutter drive means, mounted for movement from an initial position in engagement with said shutter blade to a drive position and from said initial position to an inactive position out of engagement with said shutter blade, for moving said shutter blade from said aperture covering position to said aperture uncovering position during movement to said drive position;
   releasable means, mounted for movement between a cocked position and an uncocked position, for moving said shutter drive means to said drive position in response to movement to said uncocked position and for moving said shutter drive means to said inactive position in response to movement to said cocked position; and single spring means, engaged with said shutter blade, for urging said shutter blade toward said aperture covering position and, further engageable with said shutter drive means during return of said moving means to said cocked position, for urging said shutter drive means toward said initial position.

3. In a camera having an exposure aperture, a shutter mechanism comprising:
   shutter means mounted for moving between an aperture covering condition and an aperture uncovering condition;
   moving means releasable for moving from a cocked position to an uncocked position;
   means for returning said moving means to said cocked position;
   drive means, displaceable from an initial position in engagement with said shutter means to a drive position in response to movement of said moving means to said uncocked position and displaceable from said initial position to an inactive position out of engagement with said shutter means during return of said moving means to said cocked position, for driving said shutter means to said aperture uncovering position during movement to said drive position and for permitting return of said moving means to said cocked position during movement to said inactive position; and
   spring means for urging said shutter means toward said aperture covering condition and for urging said drive means toward said initial position.

4. In a camera having an exposure aperture, a shutter mechanism comprising:
   a shutter blade pivotably mounted within the camera for movement between an aperture covering position and an aperture uncovering position:
   a shutter driver movable from an initial position in engagement with said shutter blade to a drive position to drive said shutter blade to said aperture uncovering position and further movable from said initial position to an inactive position in which said shutter driver is disengaged from said shutter blade;
   a high energy lever releasable from a cocked position to engage said shutter driver and move said shutter driver from said initial position to said drive position and engageable with said shutter driver during movement to said cocked position to move said shutter driver to said inactive position;
   means for moving said high energy lever to said cocked position; and
   a spring having a first portion engaged with said shutter blade to urge said shutter blade toward said aperture covering position and further having a second portion engageable with said shutter driver during movement of said shutter driver to said inactive position to urge said shutter driver toward said initial position while said first portion of said spring urges said shutter blade toward said aperture covering position.

5. In a camera having an exposure aperture, a shutter mechanism comprising:
   a shutter blade having a drive portion, a first aperture covering position and a second aperture uncovering position;

a high energy lever movable between a cocked position and an uncocked position;

a shutter driver having a drive lug normally engaged with said drive portion of said shutter blade and further including a drive surface and a cam surface, said shutter driver having an initial position wherein said drive surface is engageable by said high energy lever during movement to its uncocked position to drive said shutter blade to said second aperture uncovering position and wherein said cam surface is engageable by said high energy lever during movement to its cocked position to disengage said drive lug from said drive portion of said shutter blade;

means for moving said high energy lever between said cocked and uncocked positions; and a spring having a first portion in engagement with said shutter blade to urge said shutter blade to said aperture covering position and having a second portion engageable with said shutter driver to urge said shutter driver to said initial position during engagement of said cam surface by said high energy lever.

* * * * *

UNITED STATES PATENT OFFICE
CERTIFICATE OF CORRECTION

Patent No. 3,816,843    Dated June 11, 1974

Inventor(s) Robert L. Couture

It is certified that error appears in the above-identified patent and that said Letters Patent are hereby corrected as shown below:

Column 3, line 38    Delete "drive" and substitute therefor --driver--

Signed and sealed this 1st day of October 1974.

(SEAL)
Attest:

McCOY M. GIBSON JR.
Attesting Officer

C. MARSHALL DANN
Commissioner of Patents